United States Patent [19]

Oestreich et al.

[11] Patent Number: 5,138,683
[45] Date of Patent: Aug. 11, 1992

[54] OPTICAL TRANSMISSION ELEMENT HAVING A TWO-LAYER PROTECTIVE SHEATH AND THE METHOD OF MANUFACTURE

[75] Inventors: Ulrich Oestreich, Munich; Wilfried Reissenweber, Roedental, both of Fed. Rep. of Germany

[73] Assignee: Siemens Aktiengesellschaft, Munich, Fed. Rep. of Germany

[21] Appl. No.: 729,335

[22] Filed: Jul. 12, 1991

[30] Foreign Application Priority Data

Aug. 1, 1990 [DE] Fed. Rep. of Germany ....... 4024448

[51] Int. Cl.$^5$ ............................................... G02B 6/44
[52] U.S. Cl. ..................................... 385/109; 385/141
[58] Field of Search .................................. 385/109-113

[56] References Cited

U.S. PATENT DOCUMENTS

| 4,641,916 | 2/1987 | Oestreich et al. | 350/96.23 |
| 4,660,926 | 4/1987 | Mayr et al. | 350/96.23 |
| 4,664,472 | 5/1987 | Mayr et al. | 385/109 |

FOREIGN PATENT DOCUMENTS

| 0151743 | 8/1985 | European Pat. Off. |
| 1462160 | 1/1977 | United Kingdom |

Primary Examiner—John D. Lee
Assistant Examiner—John Ngo
Attorney, Agent, or Firm—Hill, Van Santen, Steadman & Simpson

[57] ABSTRACT

A protective sheath for an optical transmission element is constructed of an inside layer of polycarbonate and an outside layer of a material which has a high degree of crystallization with the crystallization temperature of the outside layer preferably being below the softening temperature of the polycarbonate used for the inside layer so that the heat of crystallization release during crystallization will retard the cooling of the inside layer to produce solidification of the inside layer from the inside of the element toward the outside.

12 Claims, 2 Drawing Sheets

OPTICAL TRANSMISSION ELEMENT HAVING A TWO-LAYER PROTECTIVE SHEATH AND THE METHOD OF MANUFACTURE

BACKGROUND OF THE INVENTION

The present invention is directed to an optical transmission element comprising at least one light waveguide that is arranged in the inside of a protective sheath which is formed of two layers, wherein the inside layer of the sheath is composed of a polycarbonate and the outside layer is composed of a protective layer that is not sensitive to stress cracks.

U.S. Pat. No. 4,641,916, whose disclosure is incorporated herein by reference thereto and which claims priority from the same German Application as European Application 0 151 743, discloses an optical transmission element which has an outside sheath formed of an inside layer and an outside layer. This patent also discloses that the inside layer may be of a polycarbonate which is extruded as an inner layer on which the outside layer, which may be a polyester, is extruded.

British Patent Specification 1 462 160 discloses a tubular sheath for optical waveguides, which sheath has an inside layer that is produced of a polyester and an outside layer which is produced, among other things, of a thermoplastic rubber or of fluoridated ethylenes.

SUMMARY OF THE INVENTION

The object of the present invention is to improve an optical transmission element of the above-mentioned type, wherein an especially simple manufacture is possible and so that the qualitively more beneficial results will be achieved in that a completely non-buckling lead should, nonetheless, be obtained.

To accomplish these goals, the present invention is directed to an improvement in an optical transmission element having at least one light waveguide that is loosely arranged on the inside of a protective sheath, which is constructed as two layers, wherein the inside layer of the sheath is composed of a polycarbonate and the outside layer is fashioned as a protective layer insensitive to stress cracks.

The improvement is that the outside layer is composed of a material that has a high degree of crystallization.

Due to the heat released during the crystallization, stresses that are frozen in and that can otherwise occur in the polycarbonate material of the inside layer during cooling are largely avoided or eliminated. The crystallization heat of the material of the outside layer prevents the formation of a temperature maximum in the inside of the inside layer.

An advantageous development of the invention occurs when the outside layer is composed of a material whose crystallization temperature lies below the softening temperature of the polycarbonate used for the inside layer.

The inventive fashioning of the protective sheath has essentially the following advantages:

The inside layer of polycarbonate that has no noteworthy crystallization but a high modulus of elasticity, even at higher temperatures, is susceptible to stress cracks. Given lasting stresses that exceed approximately 25% of the brief-duration strength, cracks can form that can lead to breaking when subjected to stress pulses. Some of these stresses are mechanically produced from the outside, for example by a cable bending. A further part of the stress particularly occurs from the cooling that often occurs too rapidly, particularly given high throughput rates in the forming device. Undesirable additional stresses occur due to delayed cooling of the material that is still soft in the middle of the polycarbonate layer, i.e., between the two hard outside shells that have already solidified. These additional stresses can be just as great as or greater than the unavoidably mechanically produced stresses that occur during cabling or the laying of the cable. The invention offers the possibility of selecting the outside layer so that it has an optimum retarding of the cooling effect on the cooling of the inside layer.

Since the crystallization temperature of the material of the outside layer lies below the softening temperature of the polycarbonate employed for the inside layer, heat constantly occurs in the region of the outside layer during the crystallization process, which is an exothermic process, and this heat assures that the inside layer is held at an elevated temperature in the region of the parting or boundary surface or layer between the outside layer and the inside layer. This will prevent a too-rapid drop of the temperature of the inside layer and, thus, of the polycarbonate from occurring in the region of the parting surface or layer. When this is not guaranteed, for example when it occurs that the cooling proceeds extremely rapidly toward the inside from the outside, then a hardening will occur in the region of the parting layer or surface, which is the outside region of the polycarbonate. In addition, the cooling and, thus, the hardening likewise will simultaneously occur due to the out-flow of heat at the polycarbonate toward the inside of the element, which is in the direction toward the filling compound. In this case, there is an intermediate region lying between the two outside shells of the polycarbonate that have already cooled and this inside region will have not yet been hardened and the residual stresses are capable of occurring therein because relaxation of the sheath is no longer possible. This residual stress can lead to the initially cited deterioration of the mechanical behavior of the protective sheath.

A polyolefinic material is expediently utilized for the outside layer. This generally has the advantage that the degree of crystallization and the crystallization heat are particularly high.

In detail, it is desirable to use a polypropylene material for the outside layer. This has the advantage that the processing temperature of this layer is matched to the inside layer.

The crystallization of the outside layer should lie at least at a value of 70% crystallization in order to offer the necessary heat for the outer region of the inside layer. Crystallization values of the outside layer between 70% and 90% are desirable.

It is especially expedient, however, when polyethylene (PE) is employed for the outside layer, because this material is inexpensive and yields a good cushioning and gives a simultaneously high elasticity for the outside layer. Potential, external pressure forces, for example when cabling, are distributed well and the resistance to buckling and flexibility can be improved, above all, by use of such a material.

The employment of a high-molecular polyolefin or, respectively, polyethylene is particular expedient. For example, a material having a molecular weight between approximately 60,000 and 150,000. Such a high-molecular PE particularly has the following advantages:

(a) A thermal conductivity is especially low at temperatures above the softening range, which correspond to the crystallization that has disappeared and to the low density, and lies lower than that of the polyester. Whereas, for example, PBTD has only approximately 40% crystallization at room temperature, this value is approximately twice as high given a highly suitable, high-molecular polyethylene. A high degree of crystallization, for example approximately in a range of about 80% in a high-molecular polyethylene, provides that a correspondingly high proportion of crystallization heat is released in the crystallization itself and a hardening of the polycarbonate layer in the outer region, which is in the proximity of the parting surface or layer, can be reliably avoided in this way, namely even when work is carried out with a high throughput speed and/or rapid cooling.

(b) The creation of the crystallization during the cooling releases a greater quantity of heat.

As a result of the polyethylene as a cover layer, the cooling wave penetrating into the inside layer from the outside layer is thereby flattened to an especially great degree.

The invention is also directed to the method for manufacturing an optical transmission element. This method is characterized in that the inside layer and the outside layer are manufactured in a co-extrusion process, in that the optical transmission element is cooled after the enveloping, in that the cooling proceeds from the outside toward the inside and is retarded by the heat released during the crystallization of the outside layer, and in that the curing process of the polycarbonate material of the inside layer will occur essentially from the inside to the outside.

Expressed in other terms, this means that the heat emission from the inside layer toward the inside to the filling compound proceeds more rapidly than toward the outside.

The manufacture of the inside layer and of the outside layer in a co-extrusion process has the advantage that both layers can be manufactured in common in one working cycle. Only a single cooling means is now required, whereby the cooling can intrinsically be implemented relatively quickly with a high throughput speed, given simultaneous, intense cooling, because the heat released by the crystallization of the outside layer guarantees a retardation of the cooling at the inside layer in the region of the separating layer or boundary surface between the two layers. Thus, what is achieved is that the curing process of the polycarbonate material of the inside layer will occur progressively from the inside surface of the inside layer toward the outside surface. The invention, thus, avoids a permanent hardening of the polycarbonate material in the outer region of the inside layer, which is the region of the parting layer, before the entire wall thickness of the polycarbonate has hardened proceeding from the inside toward the outside.

Other advantages and features of the invention will be readily apparent from the following description of the preferred embodiments, the drawings and claims.

BRIEF DESCRIPTION OF THE DRAWINGS

FIGS. 3–6 are temperature curves which extend along a transverse cross section of an optical transmission element from the center of the element to the outside surface of the element, with: FIG. 3 being a curve taken at the output of the extruder, as indicated by plane F of FIG. 2 for the device of the present invention; FIG. 4 being a curve taken after the optical element of the present invention has traversed a part of the cooling path, as indicated by the plane G of FIG. 2; FIG. 5 being at the conclusion of the cooling step or process, as indicated by the plane H of FIG. 2; and FIG. 6 being a temperature curve for a prior art optical element having a sheath with two layers.

DESCRIPTION OF THE PREFERRED EMBODIMENTS

Figure 1:
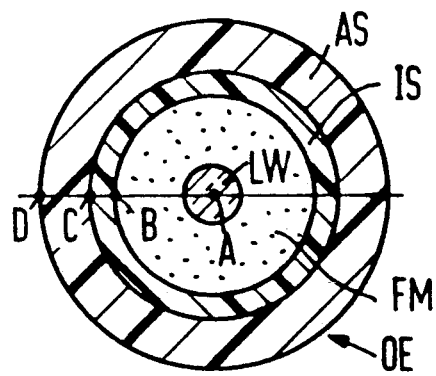
FIG. 1 is a cross sectional view of an optical transmission element according to the present invention.

The principles of the present invention are particularly useful when incorporated in an optical transmission element, generally indicated at OE in FIG. 1, which is preferably a light waveguide lead that is later stranded together with other identical elements to form a bundle. The transmission element OE includes a light waveguide LW which is embedded in a filling compound FM, which is provided on the inside of the element. A plurality of light waveguides, potentially stranded or combined into a ribbon, can also be presented in the interior. The filling compound FM is essentially composed of thixotropic, oil-containing constituents. The optical element OE comprises a twolayer protective sheath, which includes an inside layer IS and an outside layer AS. The inside layer IS is manufactured of a polycabonate (PC). The employment of high-molecular polycarbonates is especially expedient, i.e., those with a molecular weight lying above 30,000. High-molecular polycarbonates have the advantage of being less susceptible to stress cracks.

As a result of utilizing polycarbonate for the inside layer IS, this is especially hard and resistant to tension and transverse deformation. In order to avoid disadvantages, the outside layer AS, which remains soft and elastic, is applied and this has a crystallization temperature that lies under the softening temperature of the polycarbonate employed for the inside layer IS.

The outside layer AS is expediently composed of a polyolefinic material, whereby the employment of polypropylene and, preferably, polyethylene is possible.

It is advantageous, given employment of polyethylene, to use linear polyethylenes having a low density known as LLDPE. Linear low density polyethylenes have a density range of between 0.92 and 0.93.

The employment of linear polyethylenes having medium density, which are known as LMDPE, are also often advantageously possible wherein the density range will lie between 0.93 and 0.94. Both types of polyethylenes, LLDPE and LMDPE, have an especially high crystallization and dilatation or stretching, given a moderate modulus of elasticity. The value of the modulus elasticity will lie approximately between 300 and 500 N/mm$^2$. The RT-crystallization lies between 70% and 80% for LLDPE and the corresponding value for LMDPE amounts to between 80% and 90%.

An outside layer AS of polyolefins, such as polyethylene, is also flexible at low temperatures, cannot be hydrolyzed, yields an entirely buckle-resistant protective sheath together with the polycarbonate layer. The outside layer AS is also adequately swell-resistant to standard core filling materials.

Preferred ratios of wall thickness for the inside layer IS and the outside layer AS lie at approximately 1:1, i.e., the outer cover layer AS encompasses approximately 60% of the value of the lead sheath formed of AS+IS. Expressed in general terms, the outside layer AS should have a greater volume than the inside layer, whereby expedient ranges of the volumes of the inside layer IS and the outside layer AS lie between IS/AS=½ through 1/1. The strength and the modulus of elasticity of the inside layer IS are adequate in order to assure the necessary temperature stability of the optical transmission element OE and to guarantee an adequate resistance to longitudinal and shearing forces. The outer layer AS composed of a polyolefin, particularly polyethylene, acts as a cushion and provides simultaneous protection of the inner layer IS of polycarbonate. The material costs can be kept low, particularly when polyethylene is used, because this is an especially inexpensive material that is easy to process. The tintability of the outside layer composed of polyaliphate, particularly polyethylene, is normal.

Values between 0.5 mm and 0.1 mm are expediently employed for the wall thickness of the outside layer AS and for the inside layer IS.

Figure 2:
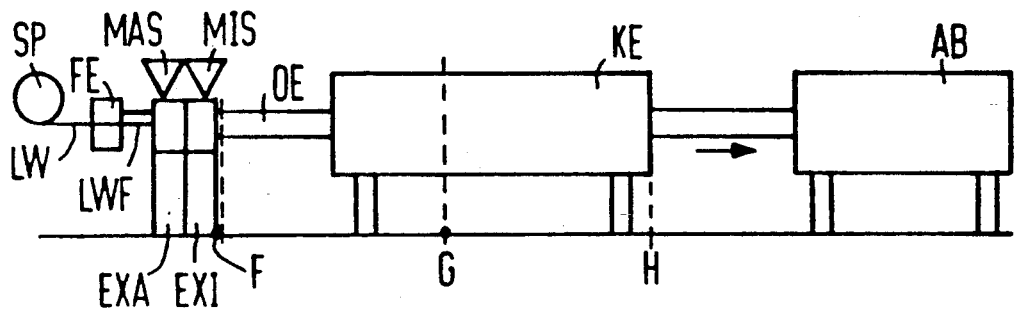
FIG. 2 is a schematic illustration of an apparatus for the manufacturing of the optical transmission element of the present invention.

The method and apparatus for fabricating the optical transmission element OE of the present invention is illustrated schematically in FIG. 2. The apparatus starts with a light waveguide LW being hauled off from a supply reel SP. The filling compound FM is applied with a filling means FE so that the light waveguide LWF coated on an outside with a filling compound is formed. This light waveguide LWF then proceeds into a double-extruder which, as illustrated, has a first extruder EXA, which is supplied with a first compound MAS for producing the inside layer IS and which is followed immediately by a second extruder EXI that is supplied with a second compound MIS for producing the outside layer AS of the optical transmission element of FIG. 1. The two extruders EXA and EXI are expediently arranged, wherein their V-shaped cones of extrusion are in a known way to supply the element OE from a common discharge. The implementation of the extrusion, thus, insures what is referred to as a co-extrusion process, for example the two layers IS and AS are simultaneously produced and the finished double-layer of the outside sheath is already present at the discharge so that the optical transmission element OE is already formed. The filling compound FM begins to cool the inside layer from the moment of first contact. This optical transmission element OE is subsequently introduced into a cooling means KE that is dimensioned appropriately long so that the optical transmission element OE is cooled nearly to room temperature at the discharge of this cooling means KE, i.e., at approximately the plane H. This is then followed by a depositing of the element OE, for example on a plate AB, wherein the optical element is deposited in loops having a correspondingly large diameter of more than 1 meter.

Figure 3:
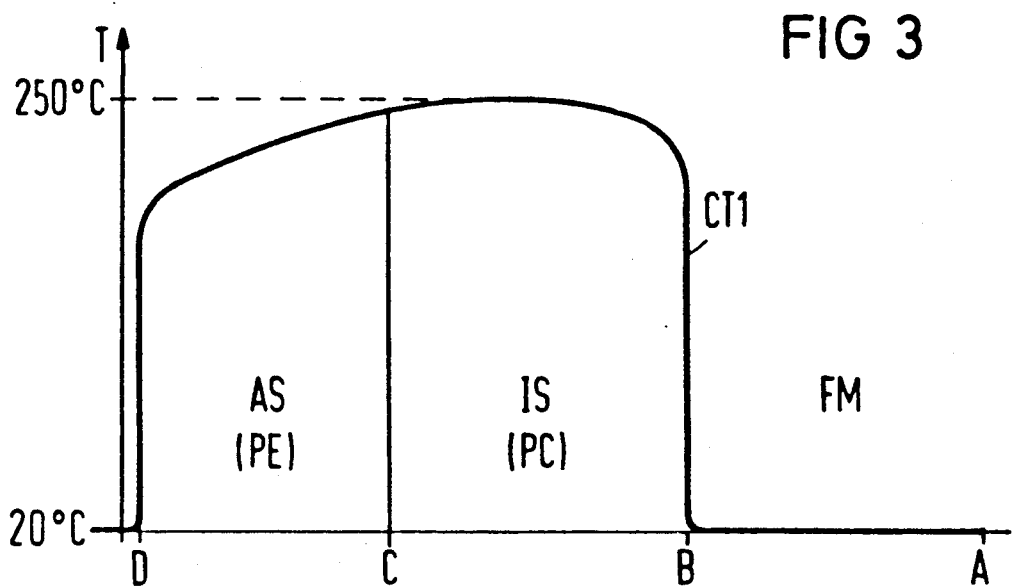

In FIG. 3, a temperature distribution curve CT1 is shown for partial cross section through the optical transmission element of FIG. 1. As may be seen from FIG. 1, a point A is the position of the longitudinal axis of the transmission element OE, wherein the point B is the point of the inner surface of the inside layer IS, which surface is in contact with the filling compound FM. The parting surface or boundary surface between the inside layer IS and the outside layer AS is referenced C and the outside surface of the outside layer AS corresponds to point D. It is assumed that the filling compound is delivered to the filling means FE in FIG. 2 at approximately room temperature or 20° C. When it is assumed that the filling compound is delivered to the filling means FE in FIG. 2 at room temperature or approximately 20° C., then it is assumed that a temperature distribution, as shown in FIG. 3, will be present at the discharge of the extruder, which is roughly at the region of the plane F in FIG. 2. From points A through B, the temperature of the filling compound lies at approximately 20°, or room temperature, whereas the inside layer IS, when the material is selected to have a melting temperature of approximately 110° C., which is the melting temperature for polycarbonate material PC, will have an initial temperature in the order of magnitude of approximately 250° C. For illustrating the example, it is assumed that the polyethylene is employed for the outside layer AS as initially mentioned, however, the other types of highly crystallizing materials having an appropriate crystallization temperature can also be employed for this. The polyethylene has a melting point roughly in the order of magnitude of 120° C., whereby the polyethylene of the outside layer initially has a temperature lying approximately in the proximity of the temperature of the polycarbonate for the inside layer IS as a result of the co-extrusion. A rapid drop to room temperature will occur at point D, which is the outer surface of the outside layer AS.

The temperature T whereat the polycarbonate of the inside layer IS begins to solidify lies at approximately 200° C., and, since this temperature is not reached by any of the layers AS and IS in FIG. 3, the overall outside sheath AS+IS is presented in a soft-molten condition at the output of the extruder.

Figure 4:
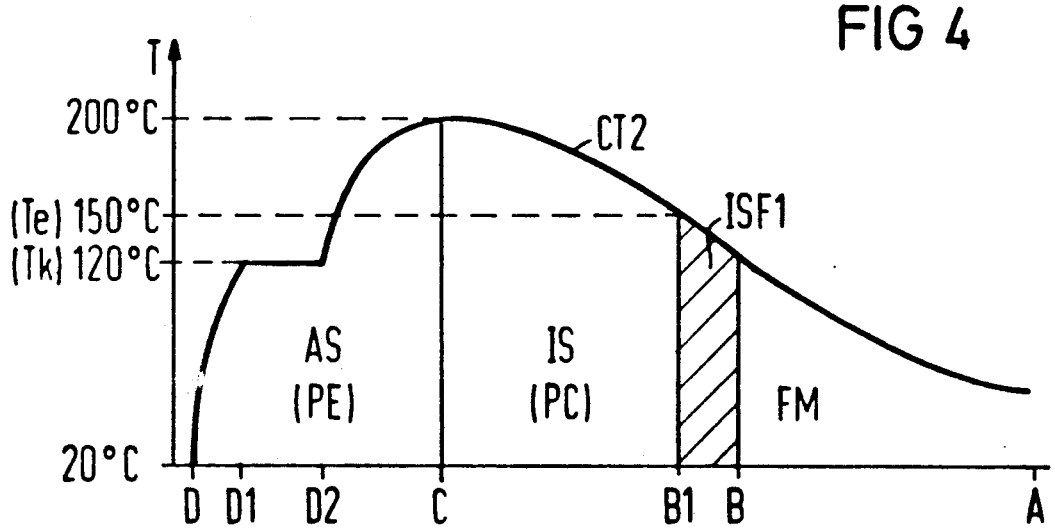

After a few meters of travel, for example 3 meters, inside the cooling means KE, which point is identified by plane G in FIG. 2, a part of the heat of the inside layer IS has been emitted into the filling compound FM so that the temperature at point A has risen to a value of approximately 50° C. Due to the heat emission in the direction toward the filling compound FM, the softening temperature Te of the polycarbonate of the inside layer IS has also been downwardly exceeded so that a hardening of the polycarbonate material, which will occur at a temperature range of from 120° C. to 150° C. has occurred in a region on the inside skin or surface of the inside layer IS between the points B and B1. This inside hardened skin is indicated by the hatching ISF1 in FIG. 4. In the region of the boundary surfaces at point C, the temperature has dropped to only approximately 200° C. and a relatively steep temperature drop has occurred inside the outside layer AS as a consequence of the influence of the cooling occurring from the outside due to the cooling means KE. Proceeding from the outer surface at point D, a steep rise in the temperature can, thereby, be registered, whereby the temperature curve CT2 has a flat portion between points D1 and D2. This occurs from the crystallization of the polyethylene of the outside layer AS at approximately a crystallization temperature Tk of 120° C., which crystallization is an exothermic process that maintains the temperature in this range. Since the crystallization heat prevents a rapid advance of the cooling front, the temperature is maintained at a value of approximately 120° C. in the polyethylene of the outside layer AS in the area between points $D_1$ and $D_2$. So much energy is offered in this way, namely due to the crystallization heat of the outside layer AS, that a high temperature value is maintained in the boundary surface or region C, namely a temperature so high that a solidification, i.e., a downward transgression of the softening temperature Te of the polycarbonate PC of the inside layer IS does not occur until the very end of the cooling process. This high temperature value in the region of the boundary layer C between the inside layer IS and the outside layer AS is maintained as long as possible during the cooling process in the range of the cooling means KE of FIG. 2. Thus, the solidification of the inside layer IS continuously proceeds gradually from the point B in the direction toward the point C and a progressive, uniform hardening of the inside layer IS is obtained as a result. This will yield practically no or extremely slight residual stresses which will be frozen into the inside layer. These residual stresses are undesirable because they will lead to a deterioration of the mechanical behavior of the inside layer IS. The advantageous influence of the procedure of the invention can, thus, be identified in a simple way in that a check is carried out to see whether the beneficial mechanical properties of the polycarbonate material of the inside layer IS remain preserved or whether poorer values occur.

The crystallization temperature Tk of the outside layer AS should lie below or at most approximately the softening temperature Te of the polycarbonate.

Without the temperature step in the region D1/D2, which is caused by the crystallization heat, a temperature curve would occur that generates a temperature maximum in the polycarbonate layer IS, particularly when the outside layer AS is thin. Further details regarding this will be illustrated in FIG. 6, which will be discussed hereinafter.

Figure 5:
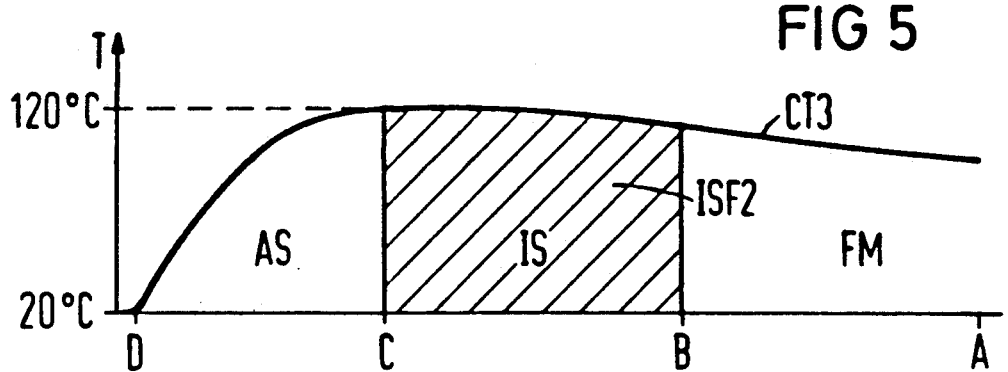

FIG. 5 shows the temperature distribution CT3 after the end of the cooling process, for example at the plane which is referenced H in FIG. 2. The internal temperature in the region of the filling compound FM has risen to approximately 80° C., whereas a temperature of about 120° C. prevails in the region of the boundary surface C. i.e., the softening temperature Te of 140° C. has just been somewhat fallen below. The point B1 of FIG. 4 that references the outer limit of the hardening has, thus, gradually migrated to the point C and practically coincides with this in FIG. 5. The entire region between points B and C is, therefore, shown hatched in FIG. 1, and the hardened region ISF2 extends over the entire wall thickness of the inside layer IS. This gradual spread of the hardening region from the inside point B to the boundary layer at point C provides the largely stress-free curing of the polycarbonate material of the inside layer IS of the present invention.

Figure 6:
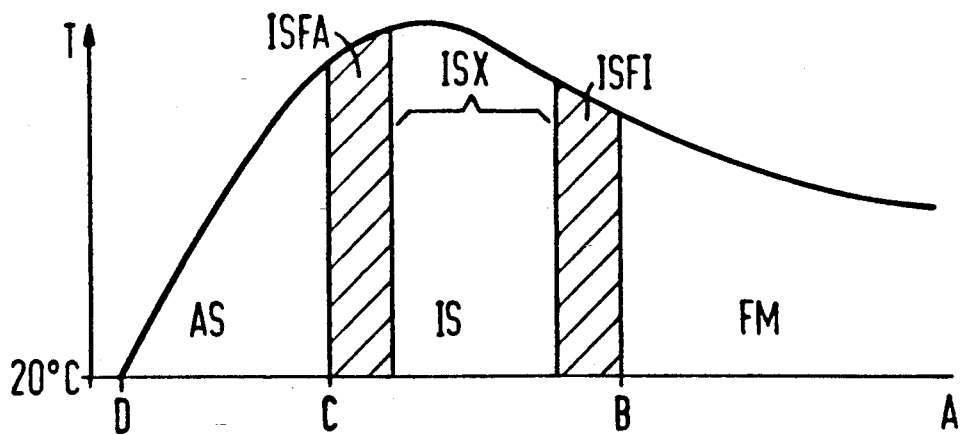

In the mode of the presentation of FIGS. 3–5, FIG. 6 schematically illustrates the curve of cooling when no crystallization material or an inadequate crystallization material is employed for the outside layer AS; for example, as illustrated in FIG. 6, when there is employment of a non-crystallization or only slightly crystallizing polyester material for the outside layer AS. The solidified region ISFA adjacent the boundary surface C has formed on the inside layer IS, due to the rapid cooling of the outside layer AS, which was not retarded by any crystallization heat occurring due to crystallization of the outside layer. Another solidified layer ISFI, likewise, occurs in the region of the inside skin or surface, namely analogous to the layer ISF1 in FIG. 4. A region ISX, wherein the volume diminished during the further course of cooling, can no longer reflow because the outer shell ISFA and the inner shell ISFI prevent a migration of the material lying between these two hardened outer and inner parting shells. This mismatched volume that has occurred in the region ISX will lead to high tensile stresses being frozen to this region and this will cause a deterioration in the behavior of the intrinsically mechanically high-grade inside layer IS of a polycarbonate material.

Although various minor modifications may be suggested by those versed in the art, it should be understood that we wish to embody within the scope of the patent granted hereon all such modifications as reasonably and properly come within the scope of our contribution to the art.

We claim:

1. In an optical transmission element comprising at least one light waveguide that is loosely arranged on an inside of a protective sheath which is constructed of an inside layer and an outside layer, said inside layer being composed of a polycarbonate and the outside layer being constructed of a protective material, which is not sensitive to stress cracks, the improvements comprising the outside layer being composed of a polyolefinic material that achieves a high degree of crystallization and that has a crystallization temperature lying below a softening temperature of the polycarbonate material employed for the inside layer.

2. In an optical transmission element according to claim 1, wherein the outside layer is composed of a polypropylene.

3. In an optical transmission element according to claim 1, wherein the outside layer is composed of a polyethylene.

4. In an optical transmission element according to claim 3, wherein the outside layer is composed of a linear polyethylene having a low density.

5. In an optical transmission element according to claim 3, wherein the outside layer is composed of a linear polyethylene having a medium density.

6. In an optical transmission element according to claim 1, wherein the inside and outside layers of the protective sheath are selected to have a wall thickness in a ratio of approximately 1:1.

7. In an optical transmission element according to claim 1, wherein the polyolefinic material of the outside layer is composed of a high-molecular polyolefinic material.

8. In an optical transmission element according to claim 7, wherein the high molecular polyolefinic material has a molecular weight between 60,000 and 150,000.

9. In an optical transmission element according to claim 1, wherein the the outside layer achieves at least 70% crystallization.

10. In an optical transmission element according to claim 9, wherein the crystallization of the outside layer lies between 70% and 90%.

11. A method for manufacturing an optical transmission element having at least one light waveguide that is loosely arranged inside of a protective sheath which is constructed of an inside layer and an outside layer with the inside layer being a polycarbonate and the outside layer being composed of a material that achieves a high degree of crystallization, said method comprising the steps of providing an optical waveguide, forming an outer sheath on the waveguide by a co-extrusion process of extruding an inside layer and simultaneously extruding an outside layer, subsequently cooling the co-extruded inside and outside layers by passing the optical transmission element through a cooling device applying a coolant from the outside toward the inside, said cooling being retarded by the heat released due to crystallization of the outside layer and the hardening process of the polycarbonate material of the inside layer occurs essentially from the inside toward the outside.

12. A method for manufacturing an optical transmission element according to claim 11, wherein the cooling process is implemented so that optimally few frozen-in stresses are produced on the inside layer formed of polycarbonate material.

* * * * *